United States Patent
Sweney et al.

(10) Patent No.: US 9,908,370 B2
(45) Date of Patent: Mar. 6, 2018

(54) DUAL MOTOR FEEDBACK SYSTEM FOR ELECTRIC MOTORCYCLES

(71) Applicant: Faster Faster Inc., Brisbane, CA (US)

(72) Inventors: Robert Wayne Sweney, San Francisco, CA (US); Harry Charles Leeming, San Francisco, CA (US)

(73) Assignee: Faster Faster Inc., Brisbane, CA (US)

( * ) Notice: Subject to any disclaimer, the term of this patent is extended or adjusted under 35 U.S.C. 154(b) by 0 days.

(21) Appl. No.: 15/076,311

(22) Filed: Mar. 21, 2016

(65) Prior Publication Data
US 2017/0267171 A1  Sep. 21, 2017

(51) Int. Cl.
*B60Q 1/00* (2006.01)
*B60C 9/00* (2006.01)

(52) U.S. Cl.
CPC ..................... *B60C 9/00* (2013.01)

(58) Field of Classification Search
CPC .......... B60Q 9/00; B60Q 9/006; B60Q 9/008
USPC ....................................................... 340/438
See application file for complete search history.

(56) References Cited

U.S. PATENT DOCUMENTS

| | | | |
|---|---|---|---|
| 4,325,199 A | 4/1982 | McEdwards | |
| 5,771,475 A | 6/1998 | Tabata et al. | |
| 5,908,453 A | 6/1999 | Tabata et al. | |
| 7,053,289 B2 | 5/2006 | Iwai et al. | |
| 7,412,309 B2* | 8/2008 | Honda | B60L 11/1877 340/438 |
| 8,164,429 B2 | 4/2012 | Reynolds et al. | |
| 8,204,243 B2 | 6/2012 | Smith | |
| 8,319,383 B2* | 11/2012 | Iizawa | H01R 39/39 310/242 |
| 2004/0090318 A1* | 5/2004 | Rothkop | B60Q 9/008 340/435 |
| 2004/0170288 A1 | 9/2004 | Maeda | |
| 2006/0097857 A1* | 5/2006 | Osaka | B60Q 9/006 340/435 |
| 2009/0073112 A1* | 3/2009 | Basson | G06F 3/016 345/156 |
| 2010/0166210 A1 | 7/2010 | Isozaki | |
| 2010/0245123 A1* | 9/2010 | Prasad | B60T 8/175 340/870.41 |
| 2010/0259417 A1* | 10/2010 | Nieves | B60Q 9/00 340/905 |
| 2012/0081222 A1 | 4/2012 | Tamaki et al. | |

(Continued)

FOREIGN PATENT DOCUMENTS

| WO | WO2011035350 A2 * | 3/2011 | |
| WO | WO 2011035350 A2 * | 3/2011 | B60Q 1/34 |

OTHER PUBLICATIONS

Beeler, R., "The Four Killer Apps of the Electric Motorcycle," AsphaltandRubber.com, Jul. 3, 2012, 17 Pages, [online] [retrieved on Jun. 10, 2013] Retrieved from the internet <http://www.asphaltandrubber.com/oped/electric-motorcycle-killer-apps/>.

*Primary Examiner* — Zhen Y Wu
(74) *Attorney, Agent, or Firm* — Fenwick & West LLP

(57) ABSTRACT

The embodiments herein describe a feedback system for an electric motorcycle. The feedback system notifies a user of the electric motorcycle of various conditions of the electric motorcycle via one or more output devices. In one embodiment, the feedback system causes the left and right grips of the handlebar of the electric motorcycle to vibrate to communicate information to the rider of the electric motorcycle.

18 Claims, 8 Drawing Sheets

(56) References Cited

U.S. PATENT DOCUMENTS

| | | | |
|---|---|---|---|
| 2012/0130580 A1 | 5/2012 | Omote et al. | |
| 2013/0154355 A1* | 6/2013 | An | B60L 1/00 307/9.1 |
| 2013/0282218 A1 | 10/2013 | Matsuda | |
| 2013/0320634 A1* | 12/2013 | Meyers | B23B 31/201 279/43 |
| 2014/0070933 A1* | 3/2014 | Gautama | B60R 16/005 340/438 |
| 2014/0225622 A1* | 8/2014 | Kudo | B60L 3/0046 324/433 |
| 2015/0101702 A1* | 4/2015 | Dean | B60C 23/003 141/4 |
| 2016/0160949 A1* | 6/2016 | Philpott | F16D 65/66 188/71.9 |
| 2016/0245664 A1* | 8/2016 | Soni | G01C 21/3697 |
| 2017/0267171 A1* | 9/2017 | Sweney | B60Q 9/00 |

* cited by examiner

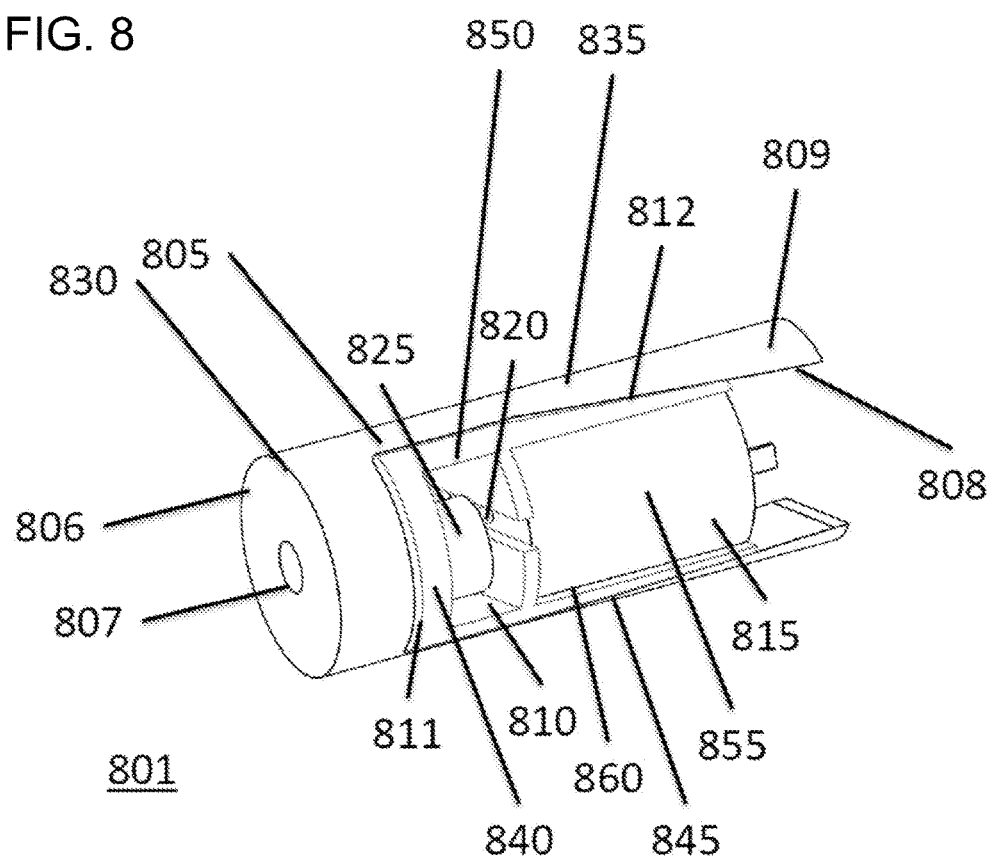

DUAL MOTOR FEEDBACK SYSTEM FOR ELECTRIC MOTORCYCLES

FIELD OF THE TECHNOLOGY

The embodiments discussed herein relate generally to electric motorcycles, and more particularly to a feedback system for electric motorcycles.

BACKGROUND

A vehicle, such as an automobile or motorcycle with an internal combustion engine, will typically convey information to its user via a display system that may comprise indicator lights, gauges, and display screens. However, in order to register information from the display system, the user must avert their attention to the display system, which prevents the user from focusing on the road ahead. Sound may be used as an alternate, less distracting means of conveying information to a user of an automobile, but is impractical on a motorcycle due to noise from the engine, exhaust, and wind. Vibration may also be used as an alternate means of conveying information to the user, but is once again impractical on a motorcycle due to inherent vibrations in the handlebars caused by the internal combustion engine. Conversely, an electric vehicle such as an electric motorcycle, produces almost no vibration when in motion compared to vehicles with an internal combustion engine. Thus, there is a need for a vibration-based method of conveying information to a user of an electric motorcycle.

SUMMARY

The embodiments herein describe a feedback system for an electric motorcycle that notifies a user of various conditions of the motorcycle. The inherent lack of engine noise and vibration in an electric motorcycle provide opportunities to convey further information to the rider via a haptic feedback system. The feedback system uses both the left and right grips of the handlebar of the electric motorcycle to convey information to the rider of the electric motorcycle. The conditions of the electric motorcycle may include for example the state of the motorcycle (e.g., on or off), speed, torque, battery charge, traction limit, directions, etc. In one embodiment, conditions of the electric motorcycle may each be associated with a feedback policy. The feedback policy for an associated condition may describe a type of feedback to provide to a user to alert the user of the condition. When a condition occurs, the electric motorcycle provides feedback to a user of the electric motorcycle via an output device according to a feedback policy associated with the condition.

In another embodiment, the feedback system may comprise a vibration motor mounted on the left side of the handlebar and a vibration motor mounted on the right side of the handlebar. The left side vibration motor and right side vibration motor may be used independently or in conjunction to convey various information to the rider.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 8 illustrates a vibration motor clamp assembly according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
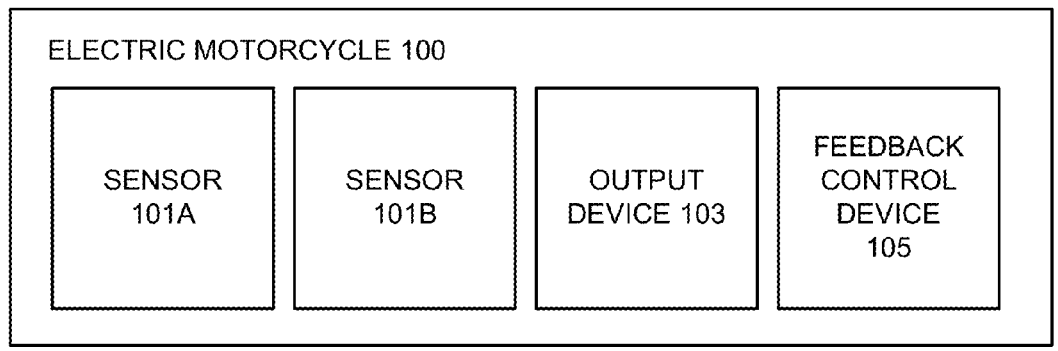
FIG. 1 is a diagram of an electric motorcycle according to one embodiment.

FIG. 1 is a diagram of an electric motorcycle according to one embodiment. Note that the electric motorcycle 100 may include components other than those illustrated in FIG. 1 such as an electric motor, a frame, wheels, tires, and suspension which are omitted for brevity. Furthermore, although the embodiments disclosed herein are described with respect to electric motorcycles, the embodiments may be applied to other forms of electric powered vehicles such as electric cars and/or other forms of vehicles where the throttle is controlled by the hand(s) of a user such as three and four wheel off road vehicles (e.g., all-terrain vehicles (ATVs)).

In one embodiment, the electric motorcycle 100 comprises one or more sensors 101 such as sensor 101A and sensor 101B. Although only two sensors are shown in FIG. 1, the electric motorcycle 100 may have any number of sensors. Each sensor 101 is a device that monitors a property that indicates a condition of the electric motorcycle 100. The properties include state (e.g., whether the electric motor of the motorcycle 100 is on or off), speed, acceleration, throttle position, battery charge, global positioning system (GPS) positions, traction limit, state of incoming messages (e.g., phone calls, text, e-mail), etc. For example, sensor 101A may measure the state of the electric motorcycle 100 (e.g., powered on or powered off) whereas sensor 101B measures the speed of the electric motorcycle 100. However, note that the sensors 101 may monitor any property of the electric motorcycle 100

Figure 3:
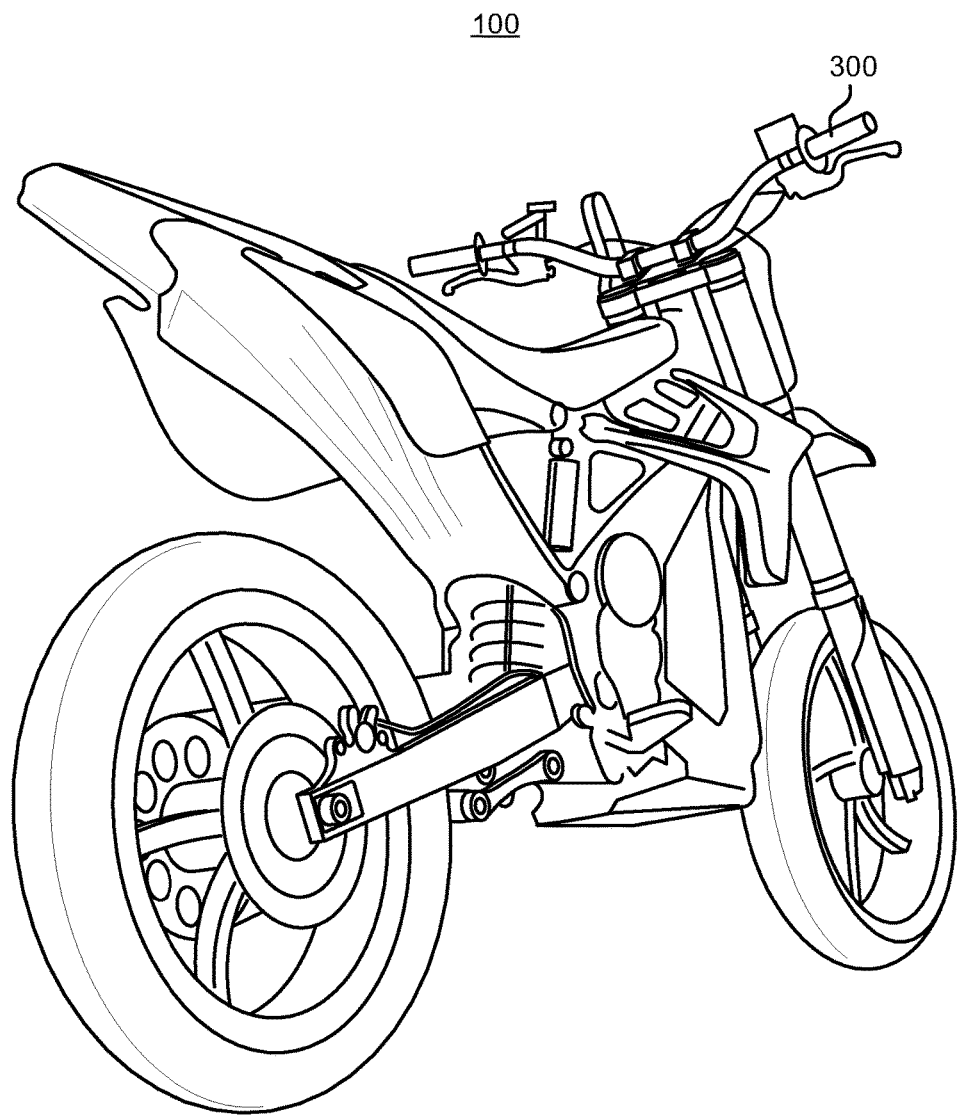
FIG. 3 illustrates a throttle mechanism of the electric motorcycle according to one embodiment.

An output device 103 outputs feedback to a user (e.g., the rider) of the electric motorcycle 100. Although only a single output device 103 is shown, the electric motorcycle 100 can have any number of output devices. In one embodiment, the output device 103 may be a throttle mechanism 300 of the electric motorcycle as shown in FIG. 3 or the handlebar 625 shown in FIG. 6. However, the output device 103 may be any device capable of providing notifications to the user via audio, visual, and/or haptic indications. Examples of other output devices include a display screen (e.g., a light emitting diode (LED) display) and/or a light on an instrument cluster of the electric motorcycle or a speaker(s) on the electric motorcycle 100.

Figure 4:
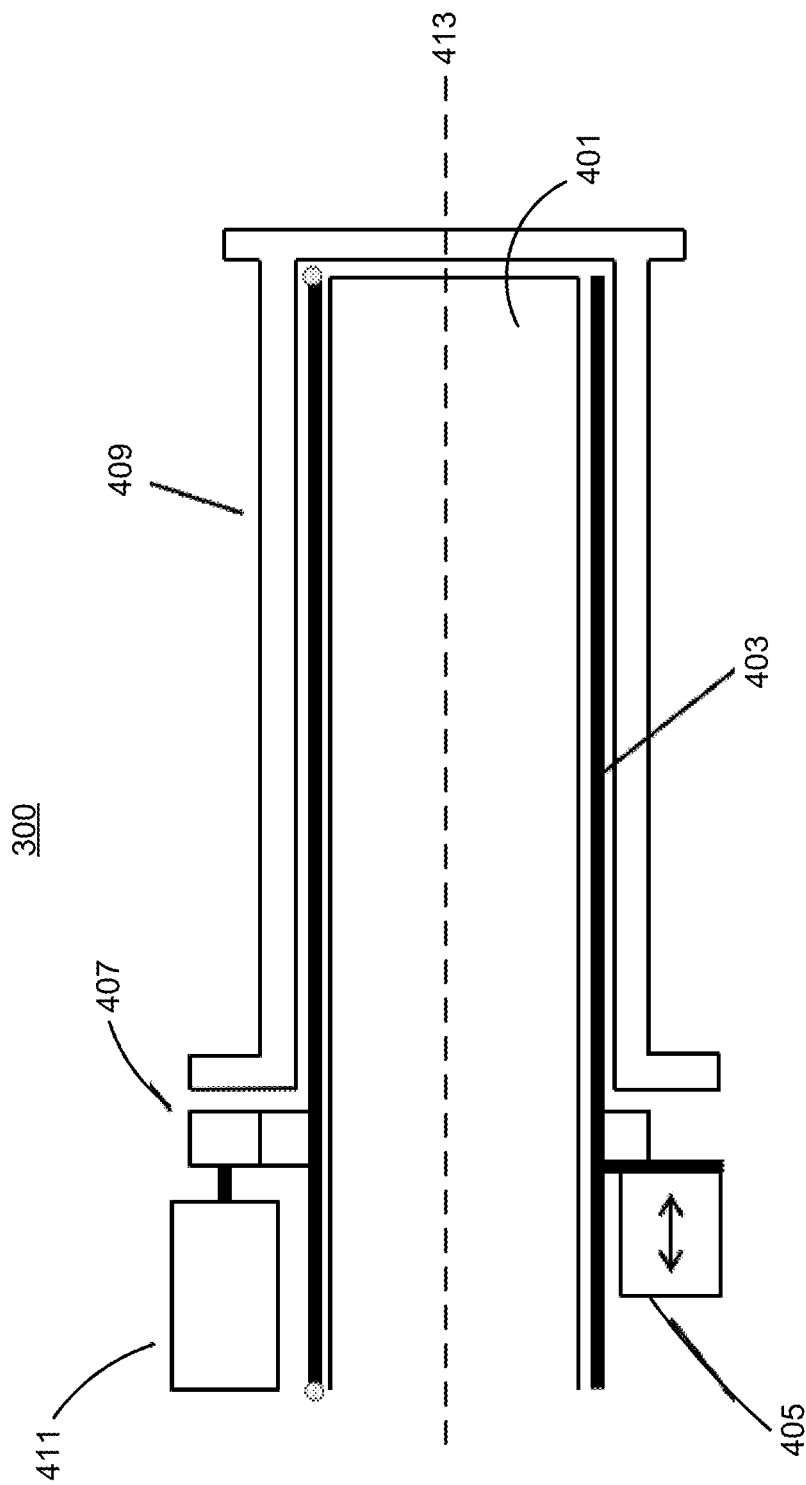
FIG. 4 is a detailed view of the throttle mechanism of the electric motorcycle according to one embodiment.

FIG. 4 is a detailed view of a twist type throttle mechanism 300 of the electric motorcycle according to one embodiment. Note that in other embodiments, thumb-press type throttle mechanisms may be used. The throttle mechanism 300 is coupled to a handlebar 401 of the electric motorcycle 100. In one embodiment, the throttle mechanism 300 includes a sleeve tube 403. The sleeve tube 403 may be made of plastic. The sleeve tube 403 encases the handlebar 401 and rotates about the axis 413 of the handlebar 401. A throttle grip 409 further encases the sleeve tube 403. Thus, both the throttle grip 409 and the sleeve tube 403 rotate together about the axis 413 of the handlebar 401.

In one embodiment, the sleeve tube 403 is coupled to a position sensor 411 (which may represent a sensor 101 from FIG. 1) via gear interface 407. As the sleeve tube 403 rotates around the handle bar 401, gears in the gear interface 407 also rotate based on the rotation of the sleeve tube 403. The position sensor 411 determines the position of the throttle mechanism 300 based on the position of the gears in the gear interface 407 as the gears rotate in correspondence with the rotation of the sleeve tube 403.

As shown in FIG. 4, the throttle mechanism 300 further includes a vibration motor 405. In one embodiment, the vibration motor 405 is a linear vibration motor. The vibration motor 405 vibrates (i.e., oscillates) in the axial direction of the handlebar 401 to produce vibration in the sleeve tube 403 that the user feels through the throttle grip 409. The vibration motor 405 may vibrate in response to a condition of the electric motorcycle 100 such as the motorcycle being in the on state. In other embodiments, the vibration motor 405 may vibrate in the radial or angular direction. The vibration motor 405 may also be fixed to the handlebar 401 rather than the sleeve tube 304 as shown in FIG. 4.

Referring back to FIG. 1, the electric motorcycle 100 includes a feedback control device 105 in one embodiment. The feedback control device 105 determines feedback to provide to the user of the electric motorcycle 100 based on conditions of the electric motorcycle 100. In one embodiment, the feedback control device 103 controls the output device 103 to provide feedback to the user based on the physical properties measured by the sensors 101. The feedback control device 105 may cause the output device 103 to provide different types of feedback based on the conditions indicated by the sensors 101. The feedback control device 105 may use audio, light, vibration or a combination thereof to provide feedback to the user via the output device 103.

Figure 2:
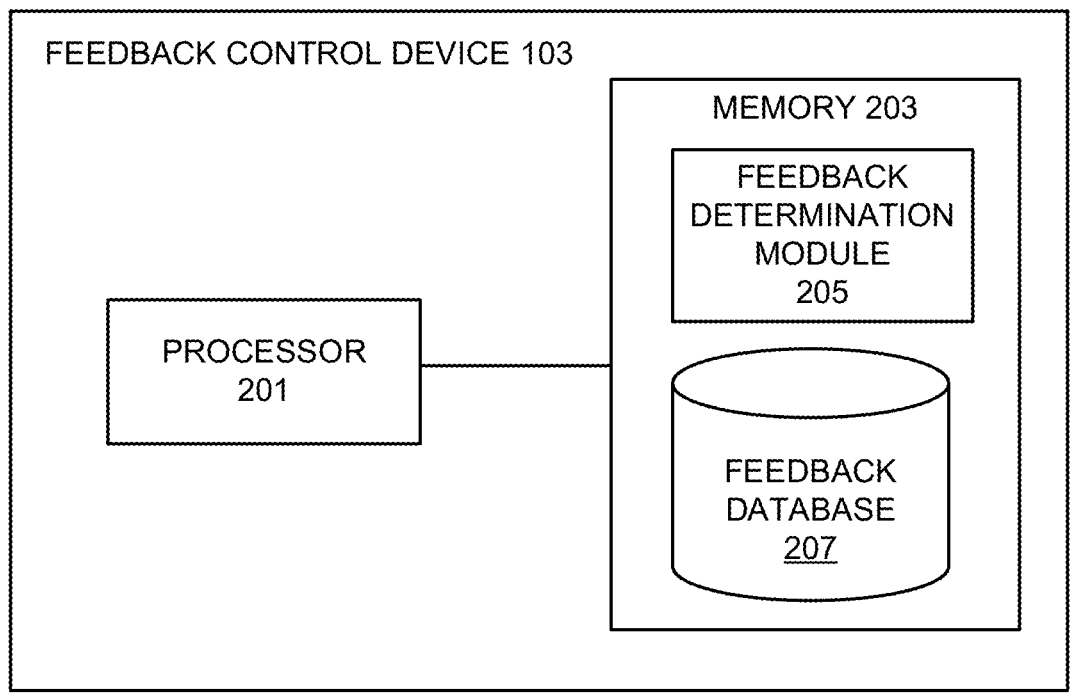
FIG. 2 is a diagram of a feedback control device of the electric motorcycle according to one embodiment.

Referring now to FIG. 2, a detailed view of the feedback control device 105 is shown according to one embodiment. Note that the feedback control device 105 may be implemented using analog circuitry, digital circuitry, or a combination thereof. In the embodiment shown in FIG. 2, the feedback control device comprises a processor 201 and a memory 203. Note that the feedback control device 103 comprises conventional features such as communication interfaces of the sensors 101 and the output device 103. However, the illustration of these conventional features has been omitted for brevity purposes. Note that in other embodiments, the feedback control device 105 may also comprise additional features other than those illustrated in FIG. 2.

In one embodiment, the processor 201 processes data signals (e.g., measurements of the sensors 101) and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 201 may comprise an arithmetic logic unit, a microprocessor, a general purpose computer, or some other information appliance equipped to transmit, receive and process electronic data signals from the memory 203, sensors 101, and output device 103.

In one embodiment, the memory 203 stores instructions and/or data that may be executed by processor 201. The instructions and/or data may comprise code (i.e., modules) for performing any and/or all of the techniques described herein. Memory 203 may be any non-transitory computer-readable storage medium such as dynamic random access memory (DRAM) device, a static random access memory (SRAM) device, Flash RAM (non-volatile storage), combinations of the above, or some other memory device known in the art.

In one embodiment, the memory 203 comprises a feedback database 207. The feedback database 207 stores different feedback policies. In one embodiment, each feedback policy describes a type of feedback to provide to the user, the output device 103 to provide the feedback, and a condition of the motorcycle that causes the output of the feedback. As mentioned previously, the types of feedback may include haptic (i.e., vibration) feedback, audio feedback, visual feedback, or combination thereof.

For example, a feedback policy may describe that the throttle mechanism 300 or handlebar 605 (i.e., an output device) of the electric motorcycle 100 vibrates (i.e., the type of feedback) in response to an indication from a sensor 101 based on a condition of the electric motorcycle 100. The feedback policy may further indicate the duration in which the output device 103 provides the feedback and/or a feedback pattern associated with the feedback.

For example, the feedback policy associated with the on-state of the electric motorcycle 100 may indicate that the throttle mechanism 300 vibrates based on the state and speed of the electric motorcycle 100. In one embodiment, the throttle mechanism 300 vibrates when the electric motorcycle 100 is powered on and at zero speed. The feedback policy may indicate a specific frequency and/or intensity (i.e., the vibration pattern) that is unique to condition of the motorcycle being in the on state at zero speed. The feedback policy may further indicate for the vibration of the throttle mechanism 300 to stop once the electric motorcycle is in motion (i.e., speed greater than zero). By having the throttle vibrate, the vibration indicates a warning to any users that touch the throttle mechanism 300 that the electric motorcycle 100 is turned on. In an alternative embodiment, the throttle mechanism 300 of the electric motorcycle 100 may vibrate during the duration of time in which the electric motorcycle 100 is powered on regardless if the motorcycle is stationary (i.e., zero speed) or moving (i.e., speed greater than zero). The feedback policy may also control other types of indications to inform the user that the electric motorcycle 100 is turned on such as displaying a light on a dashboard of the electric motorcycle and/or producing a sound (e.g., a buzzing noise).

In another example, a feedback policy may describe that the throttle mechanism 300 of the electric motorcycle 100 also vibrates in response to other conditions occurring such as system warnings (e.g., low battery charge) or if a vehicle speed threshold is reached (e.g., 65 MPH) for example. The feedback policy may specify a different frequency and/or intensity in which the throttle mechanism 300 vibrates to distinguish the vibration from the feedback indicating that the electric motorcycle 300 is turned on. The vibration pattern is different enough for a user to easily tell that a different condition is being conveyed to the user via the throttle mechanism 300. Alternatively, the same frequency and/or intensity of vibration may be used to inform the user of the other condition. In the embodiment where the throttle mechanism 300 vibrates during the entire duration that the electric motorcycle is turned on, once the other condition is no longer applicable (e.g., the vehicle speed is below the speed threshold), the vibration of the throttle mechanism 300 associated with the other condition may stop and the vibration associated with the on-state of the motorcycle 100 may resume.

As shown in FIG. 2, the memory 203 also includes a feedback determination module 205. The feedback determination module 203 determines feedback to provide to the user based on the feedback policies stored in the feedback database 207. The feedback determination module 203 receives conditions of the electric motorcycle 100 from sensors 101. The feedback determination module 203 may compare a received condition to the policies in the feedback database 207 to identify a policy associated with the received condition.

The feedback determination module 203 determines from the identified policy the type of feedback to provide to the user and the output device 103 that will be used to provide the feedback. The feedback determination module 203 controls the output device 103 to provide feedback to the user of the electric motorcycle 100 according to the identified policy.

For example, the feedback determination module 203 may receive an indication that the electric motorcycle is turned on and identifies a policy in the feedback database 207 associated with the on condition. From the policy, the feedback determination module 203 determines that the associated feedback is a vibration provided via the throttle mechanism 300 of the electric motorcycle 100. Accordingly, the feedback determination module 205 may send a signal to the throttle mechanism 300 to vibrate according to the identified policy. Specifically, the feedback determination module 205 may send an instruction to the vibration motor 405 to vibrate according to the identified policy indicating to a user that the electric motorcycle is in the on state.

Figure 6:
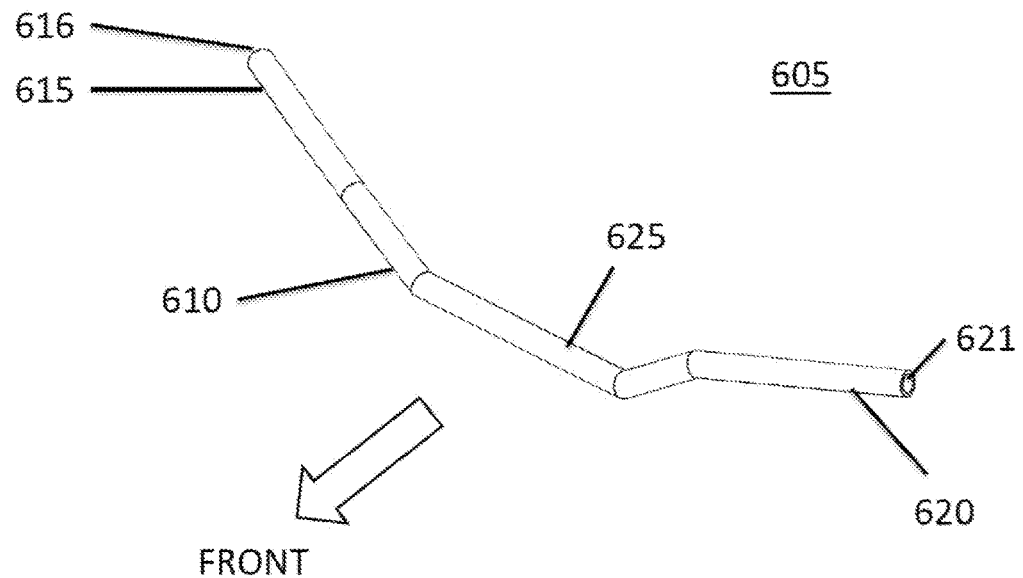
FIG. 6 illustrates a dual vibration motor feedback system of the electric motorcycle according to one embodiment.

FIG. 6 illustrates a dual vibration motor feedback system 605 of an electric motorcycle according to one embodiment. The dual vibration motor feedback system 605 comprises a handlebar 610. The handlebar 610 comprises a left grip 620, a left end 621, a right grip 615, and a right end 616. The dual motor vibration feedback system 605 further comprises a left vibration motor assembly 710 (visible in FIG. 7), which is mounted inside the left grip 620 of the handlebar 610, and a right vibration motor assembly 705 (visible in FIG. 7), which is mounted inside the right grip 615 of the handlebar 610. The handlebar 610 further comprises a center section 625 by which the handlebar 610 may be mounted to a steering mechanism, such as a suspension fork, of an electric motorcycle 100 via a handlebar clamp. The dual vibration motor feedback system 605 may further comprise hand grips, brake levers, clutch levers, and various other user interface elements which are well-known in the related field, and thus are not described in detail.

Figure 7:
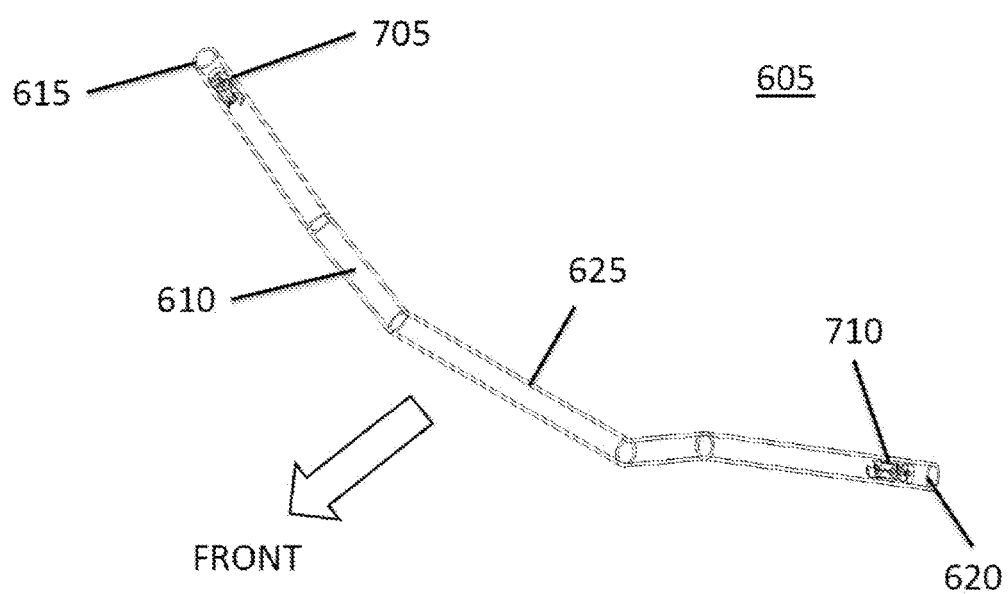
FIG. 7 illustrates a translucent view of a dual vibration motor feedback system according to one embodiment.

FIG. 7 illustrates a translucent view of the dual vibration motor feedback system 605 depicted in FIG. 6, according to one embodiment. The right vibration motor assembly 705 is visible mounted inside an inner diameter of the right grip 615 of the handlebar 610. The left vibration motor assembly 710 is visible mounted inside an inner diameter of the left grip 620 of the handlebar 610.

In some embodiments, the vibration motor assemblies 705 and 710 are similar to the vibration motor assembly depicted in FIG. 8. In some embodiments, the right and left vibration motor assemblies 705 and 710 may be positioned such that they are a specified distance inboard of the right end 616 and left end 621, respectively. In some embodiments, the specified distance may be determined by performing a frequency analysis of the handlebar 610 and various components in the dual vibration motor feedback system 605. The vibration motor assemblies 705 and 710 may be positioned to exhibit specific vibration characteristics of the handlebar 610. For example, the vibration motor assemblies 705 and 710 may be positioned in order to maximize the resulting vibrational amplitude of the handlebar 610, so as to maximize the likelihood that a user of the electric motorcycle 100 will perceive the vibration. The vibration motor assemblies 705 and 710 may also be positioned such that a vibration caused by the right vibration motor assembly 705 only vibrates the right grip 615 of the handlebar 610, and does not vibrate the left grip 620 of the handlebar 610, and vice versa. Thus, a user of the electric motorcycle 100 is easily able to distinguish between a vibration caused by the right vibration motor assembly 705 and a vibration caused by the left vibration motor assembly 710.

FIG. 8 illustrates a vibration motor clamp assembly 801 according to one embodiment. In some embodiments, the vibration motor clamp assembly 801 uses a collet style clamp, described below. The vibration motor clamp assembly 801 comprises an outer clamp 805, an inner clamp 810, and a vibration motor 815. The outer clamp 805 is cylindrical in shape and comprises an end plate 830, at least one arm 835, and an outer surface 809. In some embodiments, the end plate 830 is flat and circular in shape, and further comprises an end face 806. The arm 835 extends from the end plate 830 at an approximately perpendicular angle in a direction opposite of the end face 806. The arm 835 further comprises an angled face 808 on a side opposite of the outer surface 809. The angled face 808 extends away from the end face 806 and angles away from the outer surface 809. The end of the arm 835 is open faced. A threaded hole 807 may be formed into the end plate 830. The inner clamp 810 further comprises an end plate 840, at least one arm 845, and an outer surface 850. The end plate 840 is flat and circular in shape, and further comprises an end face 811. The arm 845 protrudes from the end plate 840 at an approximately perpendicular angle in a direction opposite of the end face 811. The arm 845 further comprises an angled face 812 on the outer surface 850. The angled face 812 extends away from the end face 811 and angles inward, away from the outer surface 850. The vibration motor 815 is roughly cylindrical in shape and further comprises an output shaft 820 and an offset weight 825. The output shaft 820 extends away from the motor 815 towards the end plate 840 of the inner clamp 810. The vibration motor 815 is mounted inside the inner clamp 810 such that an outer surface 855 of the motor 815 is adjacent to an inner surface 860 of the inner clamp 810. Furthermore, the motor 815 is mounted inside the inner clamp 810 such that the output shaft 820 and offset weight 820 face towards the end face 811 of the inner clamp 810 can spin freely when rotated by the vibration motor 815. The rotation of the offset weight 825 causes an oscillating motion (i.e. vibration) that is detectable by the user. The inner clamp 810 is positioned inside a cavity of the outer clamp 805 such that the angled face 812 is in contact with the angled face 808 of the outer clamp 805, and the end face 811 of inner clamp 810 is directed towards the end face 806 of outer clamp 805.

In some embodiments, a screw is inserted into the threaded hole 807. When the screw is threaded in sufficiently, the screw may react against the end face 811 of the inner clamp 810, causing the inner clamp 810 to slide in a direction opposite of the end face 806 of outer clamp 805. The reaction of the contacting angled faces 808 and 812 cause the outer surface 809 to expand. In some embodiments, the vibration motor assembly 801 is mounted inside a handlebar 610 as depicted in FIG. 7, and the expansion of the outer surface 809 secures the vibration motor assembly 801 inside the handlebar 610. Vibration motors and collet style clamps are well-understand in the related field and thus will not be further described herein.

The dual vibration motor system 605 described above may be used to convey a variety of different messages to a user of the electric motorcycle 100. A dual motor haptic feedback system in which the user can differentiate between a vibration in the right grip 615 of the handlebar 610 and a vibration in the left grip 620 of the handlebar 610 advantageously allows the dual vibration motor system 605 to be used to convey a wider range of information than a haptic feedback system with only one motor such as the system shown in FIG. 4. In addition to independently operating the right vibration motor 705 and left vibration motor 710, the feedback control device 105 (described above in reference to FIG. 1) may also vary the length, intensity, frequency, and pulse pattern of the vibrations to communicate different pieces of information to the user.

In some embodiments, the feedback control device 105 may be integrated or interfaced with a global positioning system (GPS) navigation system. In such a scenario, the feedback control device 105 may provide turning directions to the user by vibrating the right vibration motor 705 and left vibration motor 710 independently. In one embodiment, different vibration pattern may specific different type of turning directions. For example, in order to instruct the user to turn right, the feedback control device 105 may vibrate only the right vibration motor 705 when the electric motorcycle 100 is a threshold distance (e.g., 500 feet) away from the desired intersection based on GPS coordinates of the electric motorcycle 100 and the left vibration motor 710 is not vibrated. Similarly, in order to instruct the user to turn left, the feedback control device 105 may vibrate only the left vibration motor 710 some specified distance away from the desired intersection based on the GPS coordinates of the electric motorcycle 100 and the right vibration motor 705 is not vibrated. If a different type of turn is required, for example a u-turn, the feedback control device may simultaneously vibrate both vibration motors simultaneously. The feedback control device 105 may vibrate the handlebar 605 to provide turning direction as described above according to a feedback policy associated with providing turn by turn directions to the rider.

The GPS-integrated feedback control device 105 may also indicate to the user when the electric motorcycle 100 is about to exceed a battery range of the motorcycle relative to a network of available charging stations according to a feedback policy associated with the condition. For example, the feedback control device 105 may detect that the motorcycle 100 can travel a maximum distance (e.g., an additional 40 miles) before the battery is depleted. In order to determine if the electric motorcycle 100 will exceed a battery range of the motorcycle (e.g., the maximum distance) relative to a network of available charging stations, the feedback control device 105 may access position information (e.g., GPS coordinates) of the electric motorcycle 100 and map information of an area surrounding the position of the electric motorcycle 100. The feedback control device 105 may then access the positions of the one or more closest charging stations, and calculate the distance of a route between the electric motorcycle 100 and each of the closest charging stations. For example, because the motorcycle 100 can travel an additional 40 miles before the battery is depleted, the feedback control device 105 determines a maximum allowable distance threshold of 36 miles, which is 10% less than the actual distance the motorcycle 100 could travel. In some embodiments, the allowable distance threshold may be greater or less than 10% below the actual maximum distance of the motorcycle 100. The feedback control device 105 compares the distance of the route between the electric motorcycle 100 and each of the one or more nearest charging stations to the maximum allowable distance threshold. If the distance of the route is less than the maximum allowable distance threshold the feedback control device 105 does not need to warn the user, because the motorcycle 100 has enough range to reach the charging station before the battery is depleted. However, if the distance of the route is greater than the maximum allowable distance threshold, the feedback control system 105 may indicate to the user that he or she is about to leave the charging range of the motorcycle by rapidly pulsing both the right 705 and left 710 vibration motors in an alternating fashion (i.e. left-right-left-right).

The feedback control device 105 may also use the dual motor vibration system 605 to convey information to the user that is unrelated to GPS navigation according to feedback policies stored in the feedback database 207, such as the state of various bike dynamic systems that may be detected by the sensors 101. In some embodiments, the feedback control device 105 may pulse the right 705 and left 710 vibration motor assemblies at a slow, medium, or fast rate to indicate different types of information. For example, the feedback control device 105 may pulse the right vibration motor 705 or left vibration motor 71 at a fast rate, a medium rate, or a slow rate to convey different messages. The feedback control device 105 may receive an indication of a condition of the electric motorcycle 100 from one of the sensors 101 and identify a message to convey to the user based on the indicated condition of the electric motorcycle 100. If the feedback control device 105 receives an indication that a power limiting system of the electric motorcycle 100 is engaged (e.g., power is reduced), the feedback control device 105 may pulse the right vibration motor 705 at a fast rate, for example. If the feedback control device 105 receives an indication that a system fault error is triggered, the feedback control device 105 may pulse the right vibration motor 705 at a medium rate, for example. If the feedback control device 105 receives an indication that a tire has air pressure less than a threshold pressure, the feedback control device 105 may pulse the right vibration motor 705 at a slow rate, for example. If the feedback control device 105 receives an indication that a traction control system of the electric motorcycle 100 is engaged, the feedback control device 105 may pulse the left vibration motor 710 at a fast rate, for example. If the feedback control device 105 receives an indication that a battery or motor of the electric motorcycle 100 is at an abnormally high temperature, the feedback control device 105 may pulse the left vibration motor 710 at a medium rate, for example. If the feedback control device 105 receives an indication that a battery of the electric motorcycle 100 is at a low state of charge, the feedback control device 105 may pulse the left vibration motor 710 at a slow rate, for example.

In other embodiments, instead of varying the pulse rate (i.e. fast, medium, or slow), the feedback control device 105 may use different pulse patterns to indicate different signals. For example, the feedback control device 105 may vibrate the right vibration motor 705 in a long-short-long pattern to indicate that a power limiting system is engaged (instead of pulsing the right vibration motor 705 at a fast rate, as described above), and a short-long-short pattern to indicate a low tire pressure warning (instead of pulsing the right vibration motor 705 at a slow rate, as described above). In other embodiments, the feedback control device 105 may vary the amplitude of the resulting vibration to indicate different signals. For example, the feedback control device 105 may vibrate the right vibration motor 705 at a large amplitude to indicate a power limiting system is engaged, and a low amplitude to indicate a low tire pressure warning.

In some embodiments, the messages conveyed by the dual motor vibration system 605 and feedback control device 105 may be allocated to either the right motor 705 or left motor 710 based on a categorization of the signal. For example, all bike-related signals may be indicated via the right motor 705, and all non-bike related signals may be indicated by the left motor 710. An example of a non-bike related signal may be an incoming call or text message on the user's cell phone that is interfaced with the feedback control device 105.

Feedback Determination Method

Figure 5:
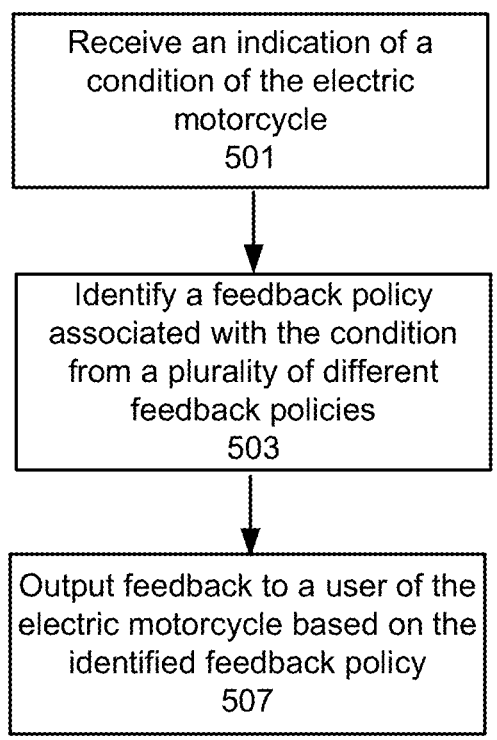
FIG. 5 is a method flow diagram for outputting feedback to a rider of the electric motorcycle according to one embodiment.

Referring now to FIG. 5, there is shown one embodiment for a method for determining feedback to provide to a user of an electric motorcycle 100. Note that in other embodiments, other steps may be performed than those illustrated in FIG. 5.

In one embodiment, the feedback control device 105 receives 501 an indication of a condition of the electric motorcycle 100. The feedback control device 105 may receive the indication from one or more sensors 101 of the electric motorcycle. The indication may be a signal describing a physical quantity measured by the sensor such as the speed of the electric motorcycle 100, state, load on the motor, battery charge, etc.

The feedback control device 105 identifies 501 a feedback policy associated with the received condition from a plurality of different feedback policies. The feedback policy describes a type of feedback to output to the user, an output device to output the feedback, and the associated condition according to one embodiment. The feedback control device 105 communicates with the output device 103 to output 507 feedback to a user of the electric motorcycle 100 based on the identified feedback policy. For example, the feedback control device 105 may control the left vibration motor 710 and the right vibration motor 705 of the electric motorcycle 100 to vibrate based on the condition of the electric motorcycle.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications of the embodiments have been illustrated and described herein, it is to be understood that the embodiments are not limited to the precise construction and components disclosed herein and that various modifications, changes, and variations may be made in the arrangement, operation, and details of the methods and apparatuses of the embodiments of the present disclosure without departing from the spirit and scope of the disclosure as it is defined in the appended claims.

What is claimed is:

1. An electric motorcycle for providing feedback to a user of the electric motorcycle, the electric motorcycle comprising:
    a handlebar connected to a frame of the electric motorcycle, the handlebar including a left grip and a right grip;
    a first vibration motor assembly inserted into an inner diameter of the left grip;
    a second vibration motor assembly inserted into an inner diameter of the right grip;
    a sensor configured to provide an indication of a condition of the electric motorcycle, the condition comprising the electric motorcycle approaching an intersection where the electric motorcycle is supposed to turn according to directions generated by a global positioning system (GPS) navigation system of the electric motorcycle;
    a feedback control device communicatively coupled to the sensor and to the first vibration motor and the second vibration motor, the feedback control device configured to:
        receive, from the sensor, the indication of the condition of the electric motorcycle approaching an intersection where the electric motorcycle is supposed to turn;
        access a plurality of feedback policies responsive to the indication, each feedback policy describing feedback to provide to the user in response to a corresponding condition of the motorcycle, the feedback described by the feedback policy being unique to the feedback policy;
        identify, from the plurality of feedback policies, a feedback policy associated with the condition corresponding to the received indication
        cause the first vibration motor assembly in the left grip to vibrate and prevent the second vibration motor assembly in the right grip from vibrating responsive to the directions indicating a left turn at the intersection based on the identified feedback policy; and
        cause the second vibration motor assembly in the right grip to vibrate and prevent the first vibration motor assembly in the left grip from vibrating responsive to the directions indicating a right turn at the intersection based on the identified feedback policy.

2. The electric motorcycle of claim 1, wherein the first vibration motor assembly is inserted into the inner diameter of the left grip a predetermined distance from an end of the left grip to maximize vibration in the left grip and the second vibration motor assembly is inserted into the inner diameter of the right grip a predetermined distance from an end of the right grip to maximize vibration in the right grip.

3. The electric motorcycle of claim 1, wherein the first vibration motor assembly and the second vibration motor assembly include a collet style clamp.

4. The electric motorcycle of claim 3, wherein the collet style clamp comprises:
    a cylindrical shaped outer clamp including a closed end, an open faced end that is opposite the closed faced end, and a threaded hole in the closed end of the cylindrical shaped outer clamp;
    an inner clamp mounted inside the cylindrical shaped outer clamp, the inner clamp including a closed end that is adjacent to the closed end of the cylindrical shaped outer clamp;
    a vibration motor mounted inside the inner clamp, the vibration motor including an output shaft connected to an offset weight, the output shaft and offset weight spinning freely within the inner clamp when rotated by the vibration motor; and
    a screw inserted into the threaded hole, the screw pushing the closed end of the inner clamp in a direction towards the open end of the open faced end of the outer clamp thereby expanding the open faced end of the outer clamp within the handlebar to secure the first vibration motor assembly and the second vibration motor assembly inside the handlebars.

5. The electric motorcycle of claim 1, further comprising:
    determining that the electric motorcycle is a threshold distance from the intersection based on GPS coordinates of the electric motorcycle; and
    wherein the first vibration motor assembly or the second vibration motor assembly vibrates responsive to determining that the electric motorcycle is the threshold distance from the intersection.

6. The electric motorcycle of claim 1, wherein the feedback control device is further configured to:
    cause both the first vibration motor assembly in the left grip and the second vibration motor assembly in the right grip to simultaneously vibrate responsive to the directions indicating a u-turn at the intersection.

7. The electric motorcycle of claim 1, further comprising:
    receiving a condition of the electric motorcycle that a battery range of the electric motorcycle is less than a distance to a charging station nearest to the current position of the electric motorcycle, the feedback control device is further configured to:
        determine a threshold percentage of the battery range of the electric motorcycle according to a feedback policy associated with the condition;
        determine a distance to the charging station nearest to the current position of the electric motorcycle based on GPS coordinates of the electric motorcycle according to the feedback policy associated with the condition; and
        responsive to the distance to the charging station being greater than the threshold percentage of the battery range of the electric motorcycle, causing both the first vibration motor assembly in the left grip and the second vibration motor assembly in the right grip to vibrate according to the feedback policy associated with the condition.

8. The electric motorcycle of claim 7, wherein the feedback control device causes the first vibration motor assembly in the left grip and the second vibration motor assembly in the right grip to alternately vibrate.

9. The electric motorcycle of claim 1, wherein the feedback control device causes the first vibration assembly in the left grip and the second vibration motor assembly in the right grip to vibrate at different rates to convey information to a rider of the electric motorcycle, the different rates including a first rate, a second rate that is greater than the first rate, and a third rate that is greater than the first rate and the second rate.

10. The electric motorcycle of claim 9, wherein the feedback control device causes at least one of the first vibration assembly in the left grip and the second vibration motor assembly in the right grip to vibrate at either the first rate, the second rate, or the third rate responsive to the feedback control device receiving an indication that power of the electric motorcycle is reduced.

11. The electric motorcycle of claim 9, wherein the feedback control device causes at least one of the first vibration assembly in the left grip and the second vibration motor assembly in the right grip to vibrate at either the first rate, the second rate, or the third rate responsive to the feedback control device receiving an indication of a system error of the electric motorcycle.

12. The electric motorcycle of claim 9, wherein the feedback control device causes at least one of the first vibration assembly in the left grip and the second vibration motor assembly in the right grip to vibrate at either the first rate, the second rate, or the third rate responsive to the feedback control device receiving an indication that air pressure of at least one tire of the electric motorcycle is less than a threshold air pressure.

13. The electric motorcycle of claim 9, wherein the feedback control device causes at least one of the first vibration assembly in the left grip and the second vibration motor assembly in the right grip to vibrate at either the first rate, the second rate, or the third rate responsive to the feedback control device receiving an indication of a reduction of traction of the electric motorcycle.

14. The electric motorcycle of claim 9, wherein the feedback control device causes at least one of the first vibration assembly in the left grip and the second vibration motor assembly in the right grip to vibrate at either the first rate, the second rate, or the third rate responsive to the feedback control device receiving an indication that a temperature of a battery of the electric motorcycle exceeds a threshold temperature.

15. The electric motorcycle of claim 9, wherein the feedback control device causes at least one of the first vibration assembly in the left grip and the second vibration motor assembly in the right grip to vibrate at either the first rate, the second rate, or the third rate responsive to the feedback control device receiving an indication that a temperature of a motor of the electric motorcycle exceeds a threshold temperature.

16. The electric motorcycle of claim 1, wherein the feedback control device is further configured to cause the first vibration assembly in the left grip to vibrate responsive to electric motorcycle related conditions and wherein the feedback control device is configured to cause the second vibration assembly in the second grip to vibrate responsive to non-electric motorcycle related conditions.

17. The electric motorcycle of claim 1, wherein the feedback control device is further configured to cause the first vibration assembly in the left grip to vibrate responsive to non-electric motorcycle related conditions and wherein the feedback control device is configured to cause the second vibration assembly in the second grip to vibrate responsive to electric motorcycle related conditions.

18. A tactile feedback system for use with an electric motorcycle, the tactile feedback system comprising:
  left and right vibration motor assemblies located inside an inner diameter of a left grip and inside an inner diameter of a right grip of a motorcycle handlebar, respectively, each vibration motor assembly including a vibration motor;
  a sensor that senses a condition of the electric motorcycle approaching an intersection where the electric motorcycle is supposed to turn according to directions generated by a global positioning system (GPS) navigation system of the electric motorcycle and provides an indication of the sensed condition; and
  a feedback control device communicatively coupled to the sensor and to the vibration motor assemblies, the feedback control device controlling vibration of the vibration motors according to the condition indicated by the sensor, the vibration of the vibration motors determined by feedback policies that describe different vibrations corresponding to different conditions indicated by the sensor,
  wherein at least one of the feedback policies describes that the left vibration motor assembly vibrates and the right vibration motor assembly does not vibrate responsive to the directions indicating a left turn at the intersection, and the right vibration motor assembly vibrates and the left vibration motor assembly does not vibrate responsive to the directions indicating a right turn at the intersection.

* * * * *

UNITED STATES PATENT AND TRADEMARK OFFICE
CERTIFICATE OF CORRECTION

PATENT NO. : 9,908,370 B2  
APPLICATION NO. : 15/076311  
DATED : March 6, 2018  
INVENTOR(S) : Sweney et al.

Page 1 of 1

It is certified that error appears in the above-identified patent and that said Letters Patent is hereby corrected as shown below:

In the Claims

Column no: 11, Line(s): 55-56, Claim 1: "indication cause" to read as —indication; cause—

Column no: 14, Line(s): 11, Claim 16: "second grip" to read as —right grip—

Column no: 14, Line(s): 18, Claim 17: "second grip" to read as —right grip—

Signed and Sealed this
Seventeenth Day of July, 2018

Andrei Iancu
*Director of the United States Patent and Trademark Office*